United States Patent
Okano et al.

(10) Patent No.: US 8,321,094 B2
(45) Date of Patent: Nov. 27, 2012

(54) ENGINE CONTROL SYSTEM FOR CONSTRUCTION MACHINE

(75) Inventors: Yasuo Okano, Tsuchiura (JP); Hidetoshi Satake, Tsuchiura (JP); Akihiro Narazaki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 565 days.

(21) Appl. No.: 12/667,663

(22) PCT Filed: Jul. 2, 2008

(86) PCT No.: PCT/JP2008/061999
§ 371 (c)(1),
(2), (4) Date: Jan. 4, 2010

(87) PCT Pub. No.: WO2009/005094
PCT Pub. Date: Jan. 8, 2009

(65) Prior Publication Data
US 2010/0332088 A1    Dec. 30, 2010

(30) Foreign Application Priority Data
Jul. 3, 2007    (JP) ................................ 2007-175422

(51) Int. Cl.
*G06F 19/00*    (2011.01)
(52) U.S. Cl. ........................................................ 701/50
(58) Field of Classification Search .................. 37/348, 37/466; 172/2–11; 701/50, 102, 103, 110, 701/115, 207; 123/350, 352, 357, 361, 376, 123/396, 399, 403; 56/10.2 R, 10.2 A, 10.2 G; 180/170, 65–67
See application file for complete search history.

(56) References Cited

U.S. PATENT DOCUMENTS
6,506,139 B2 *   1/2003   Hirt et al. ........................... 477/3
(Continued)

FOREIGN PATENT DOCUMENTS
JP       1-224419      9/1989
(Continued)

OTHER PUBLICATIONS

International Search Report w/English Translation dated Sep. 22, 2008 (Two (2) pages).

*Primary Examiner* — Robert Pezzuto
(74) *Attorney, Agent, or Firm* — Crowell & Moring LLP

(57) ABSTRACT

To provide an engine control system for a construction machine, which can decrease a consumption of energy to be required for the reduction of an engine lag-down that occurs upon a sudden increase in load, such as upon quick manipulation of a control device, is provided with a load condition detecting unit, a charge amount detecting unit, a boost pressure sensor, and a determination processing unit. The load condition detecting unit includes a manipulation stroke detector for detecting that a control device has been fully manipulated, and also, a first computation unit of a controller. The charge amount detecting unit can detect an amount of charge in a capacitor. The determination processing unit includes a determination processing unit of the controller. The determination processing unit performs processing to feed electric power from the capacitor to an electric motor if, when it has been detected in concomitance with manipulation of the control device by the load condition detecting means that a torque to be absorbed by a pump would exceed an output torque of an engine, a boost pressure detected by the boost pressure sensor is determined to be lower than a predetermined pressure, and moreover, an amount of charge in the capacitor as detected by the charge amount detecting unit is determined to be an amount of charge that can drive the electric motor for a predetermined time.

7 Claims, 2 Drawing Sheets

U.S. PATENT DOCUMENTS

| | | | |
|---|---|---|---|
| 6,820,356 B2 * | 11/2004 | Naruse et al. | 37/348 |
| 8,000,850 B2 * | 8/2011 | Nasr et al. | 701/20 |
| 8,260,508 B2 * | 9/2012 | Price et al. | 701/50 |
| 2011/0000722 A1 * | 1/2011 | Kawashima | 180/65.28 |
| 2011/0264337 A1 * | 10/2011 | Takanashi et al. | 701/50 |

FOREIGN PATENT DOCUMENTS

| | | |
|---|---|---|
| JP | 2004-92456 | 3/2004 |
| JP | 2004-150306 | 5/2004 |
| JP | 2006-275019 | 10/2006 |

* cited by examiner

ENGINE CONTROL SYSTEM FOR CONSTRUCTION MACHINE

TECHNICAL FIELD

This invention relates to an engine control system for a construction machine such as a hydraulic excavator, which is provided with an electric motor drivable by a turbocharged engine and a hydraulic pump and can suppress a lag-down that is a temporary drop in engine speed.

BACKGROUND ART

Conventionally, a construction machine such as a hydraulic excavator provided with a turbocharged engine generally develops a phenomenon called "lag-down", that is, a temporary drop in engine speed when a hydraulic actuator is quickly operated and a sudden load is applied to the engine. This phenomenon takes place because, when the engine is not under load, the injection rate of fuel is low, the amount of exhaust gases that act on a turbocharger decreases to result in a low boost pressure, a response delay occurs in the rise of an engine torque, and therefore, a hydraulic load (a torque to be absorbed by a hydraulic pump) caused by the quick manipulation exceeds an engine torque. A temporary drop in engine torque due to such a lag-down manifests as a change in engine sound, so that an unpleasant feeling is given to an operator. Further, the delay in the rise of engine speed invites a decrease in the delivery rate of the hydraulic pump, and therefore, also affects work capacity and controllability. In addition, responsive to a reduction in engine speed, a governor increases the injection rate of fuel in an attempt to have the engine speed returned to a normal engine speed, thereby causing emission of black smoke and a deterioration of fuel economy by a quick injection of fuel.

Keeping in step with the move toward construction machines of higher performance in recent years, the maximum flow rate of a hydraulic pump and the maximum drive force of a hydraulic actuator tend to increase year by year, and therefore, the output required for an engine also has a tendency to increase. In an engine mounted on a construction machine in recent years, an increase in output is generally achieved by raising the turbo boost pressure. However, the engine torque during a decrease in supercharging has not changed much for years because it depends on the displacement of an engine. As a corollary to this, the engine torque during a decrease in supercharging has become increasingly different from an increase in engine output during supercharging, so that the time required for a rise in torque has become longer. As a consequence, it has become a problem in hydraulic control to prevent a lag-down that occurs by a quick manipulation as mentioned above.

For the above-described problem, it has been a conventional practice to choose an engine having a sufficient non-boost torque. However, an engine with a large non-boost torque has a larger size due to an increase in displacement or the like, thereby raising problems in cost, installation space and so on.

In the engine control system which is disclosed in JP-A-1-224419 and is useful for a civil engineering and construction machine, a reduction of lag-down is, therefore, achieved by arranging a means for applying a drag load during non-operation, increasing the engine torque to a certain extent to raise the turbocharged boost torque beforehand, and hence shortening the time required until an engine torque rises.

DISCLOSURE OF THE INVENTION

Problem to be Solved by the Invention

In the above-mentioned conventional technology disclosed in JP-A-1-224419, however, the energy consumed for the drag load applied during non-operation is not used at all for work. The conventional technology, therefore, involves problems that the fuel economy is impaired, the energy efficiency is deteriorated, and therefore, the engine control system tends to become uneconomical.

The present invention has been completed in view of the above-mentioned actual situation of the conventional technology, and its object is to provide an engine control system for a construction machine, which can reduce a consumption of energy required for the reduction of an engine lag-down that occurs upon a sudden increase in load, such as upon quick manipulation of a control device.

Means for Solving the Problem

To achieve this object, the present invention is characterized in that in an engine control system for a construction machine, said engine control system being provided with a turbocharged engine, an electric motor and hydraulic pump drivable by the engine, a hydraulic actuator operable by pressure oil delivered from the hydraulic pump, a control device for controlling the hydraulic actuator, and a capacitor capable of feeding electric power to the electric motor, the engine control system is provided with a load condition detecting means for detecting a condition that a torque to be absorbed by the hydraulic pump would exceed an output torque of the engine, a charge amount detecting means capable of detecting an amount of charge in the capacitor, a boost pressure sensor, and a determination processing means for performing processing to feed electric power from the capacitor to the electric motor if, when the condition that a torque to be absorbed by the hydraulic pump would exceed an output torque of the engine has been detected by the load condition detecting means in concomitance with manipulation of the control device, a boost pressure detected by the boost pressure sensor is determined to be lower than a predetermined pressure, and moreover, an amount of charge in the capacitor as detected by the charge amount detecting means is determined to be an amount of charge that can drive the electric motor for a predetermined time.

If, upon detection in concomitance with quick manipulation or the like of the control device by the load condition detecting means of a condition that a torque to be absorbed by the hydraulic pump as a result of the quick manipulation or the like of the control device would exceed an output torque of the engine in the present invention constructed as described above, the boost pressure detected by the boost pressure sensor is determined to be lower than the predetermined pressure and moreover, an amount of charge in the capacitor as detected by the charge amount detecting means is determined to be an amount of charge that can drive the electric motor for the predetermined time, the processing is performed by the determination processing means to feed electric power from the capacitor to the electric motor so that the electric motor is driven for the predetermined time to reduce the load on the engine. As a consequence, the rise time of an engine torque can be shortened to reduce an engine lag-down. After elapse of the predetermined time, the electric motor is driven by the engine so that storage of charge in the capacitor is performed. As described above, an engine lag-down which tends to occur upon quick manipulation or the like of the control device can be reduced by a discharge from the capacitor. After elapse of the predetermined time, charging of the capacitor is performed by driving the electric motor with the engine, and at a time point that a necessary amount of charge has been accumulated, the charging by the electric motor is stopped. It is, therefore, possible to decrease the consumption of energy required for the reduction of an engine lag-down.

Advantageous Effects of the Invention

According to the present invention, an engine lag-down which occurs upon quick manipulation or the like of the control device is reduced by relying upon a discharge from the capacitor. It is, therefore, possible to decrease the consumption of energy required for the reduction of an engine lag-down. The present invention is, therefore, economically advantageous compared with the conventional technology.

BEST MODES FOR CARRYING OUT THE INVENTION

Figure 1:
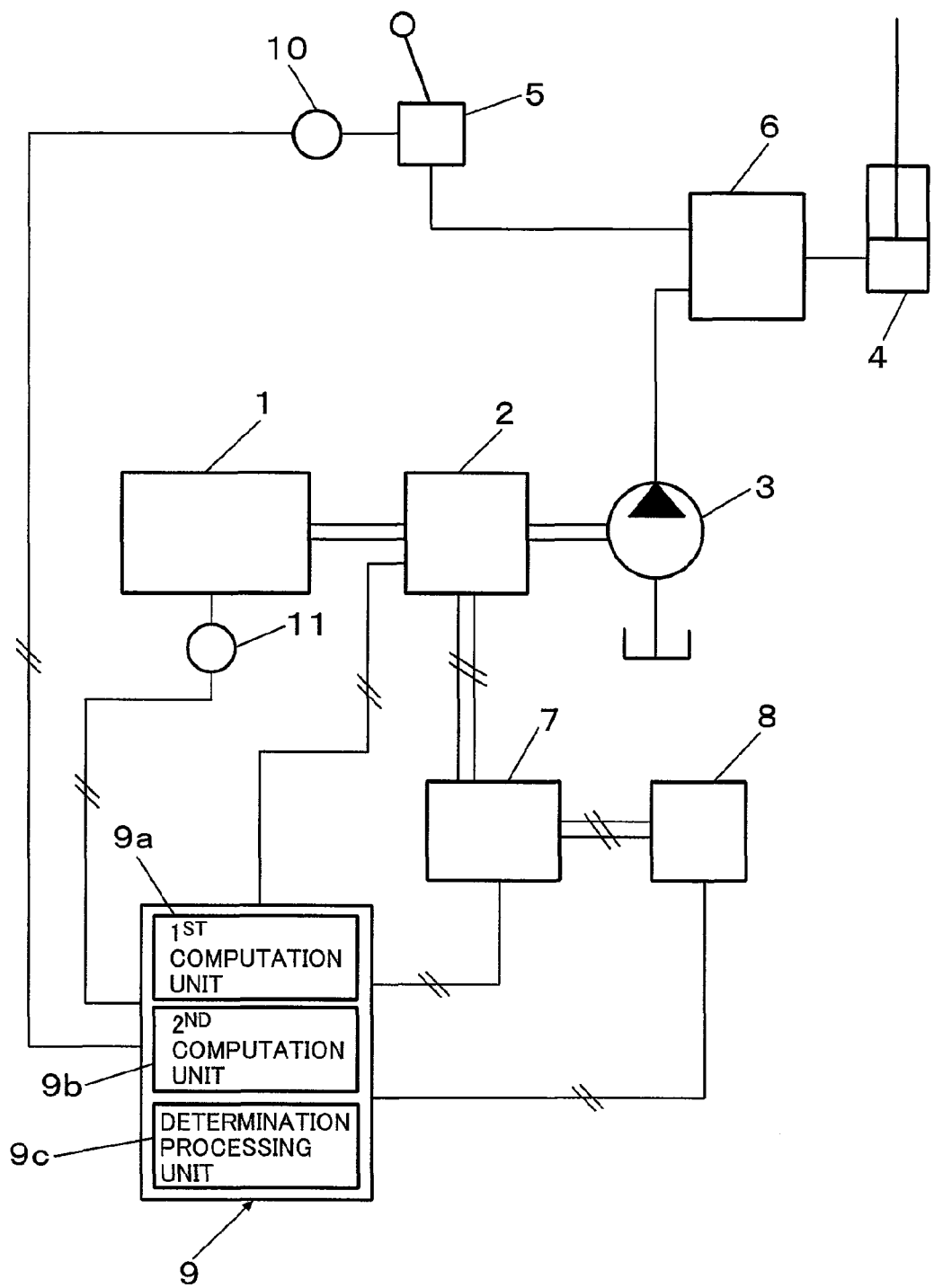
FIG. 1 is a circuit diagram showing one embodiment of an engine control system according to the present invention for a construction machine.

Best modes for carrying out the engine control system according to the present invention for the construction machine will hereinafter be described based on drawings.

The engine control system according to this embodiment is to be arranged on a construction machine, for example, a hydraulic excavator, and is provided with a turbocharged engine 1, an electric motor 2 and hydraulic pump 3 drivable by the engine 1, a hydraulic actuator 4 such as a boom cylinder or arm cylinder operable by pressure oil delivered from the hydraulic pump 3, a control device 5 for controlling the hydraulic actuator 4, and a control valve 6 for controlling a flow of pressure oil to be fed from the hydraulic pump 3 to the hydraulic actuator 4 in accordance with a manipulation stroke of the control device 5. The above-mentioned electric motor 2 is also used as an electric power generator.

This hydraulic excavator is also provided with a capacitor 8 for performing storage of charge in concomitance with driving of the electric motor 2 and a current controller 7 for controlling the storage of charge in the capacitor 8.

This embodiment arranged on such a hydraulic excavator is provided with a controller 9 for receiving a signal from the capacitor 8, a manipulation stroke detector 10 for detecting a manipulation stroke of the control device 5 and outputting a detection signal to the controller 9, and a boost pressure sensor 11 arranged as an attachment to the engine 1 for detecting a boost pressure and outputting a detection signal to the controller 9.

The above-mentioned controller 9 includes a first computation unit 9a, a second computation unit 9b, and a determination processing unit 9c. The first computation unit 9a computes the manipulation stroke based on the detection signal from the manipulation stroke detector 10, and based on its level, detects a condition that a torque to be absorbed by the hydraulic pump would exceed an output torque of the engine. The second computation unit 9b computes an amount of charge in the capacitor 8 based on a signal outputted from the capacitor 8.

The determination processing unit 9c determines whether or not the manipulation stroke computed at the first computation unit 9a would make a torque, which would be absorbed by the hydraulic pump, exceed the output torque of the engine. When determined to be the condition that the torque to be absorbed by the hydraulic pump would exceed the output torque of the engine, the determination processing unit 9c determines whether or not the boost pressure detected by the boost pressure sensor 11 is lower than the predetermined pressure. When determined to be lower than the predetermined pressure, the determination processing unit 9c performs processing to determine whether or not the amount of charge in the capacity 8 as computed at the second computation unit 9b is an amount of charge capable of driving the electric motor 2 for a predetermined time A. When determined to be an amount of charge capable of driving the electric motor 2 for the predetermined time A in the above-described processing, the determination processing unit 9c performs processing such that an instruction signal is outputted to the current controller 7 to instruct a discharge from the capacitor 8 and electric power is fed from the capacitor 8 to the electric motor 2.

The above-mentioned manipulation stroke detector 10 and the first computation unit 9a of the controller 9 constitute the load condition detecting means for detecting a condition that a torque to be absorbed by the hydraulic pump would exceed an output torque of the engine. Further, the above-mentioned second computation unit 9b of the controller 9 constitutes the charge amount detecting means for detecting an amount of charge in the capacitor 8. Furthermore, the above-mentioned determination processing means 9c of the processor 9 constitutes the determination processing means for performing processing to feed electric power, which is stored in the capacitor 8, to the electric motor 2 if, when the control device 5 is detected by the load condition detecting means to have been fully manipulated (manipulation stroke: maximum), a boost pressure detected by the boost pressure sensor 11 is determined to be lower than the predetermined pressure, and moreover, an amount of charge in the capacitor 8 as detected by the charge amount detecting means is determined to be an amount of charge that can drive the electric motor 2 for the predetermined time A.

Figure 2:
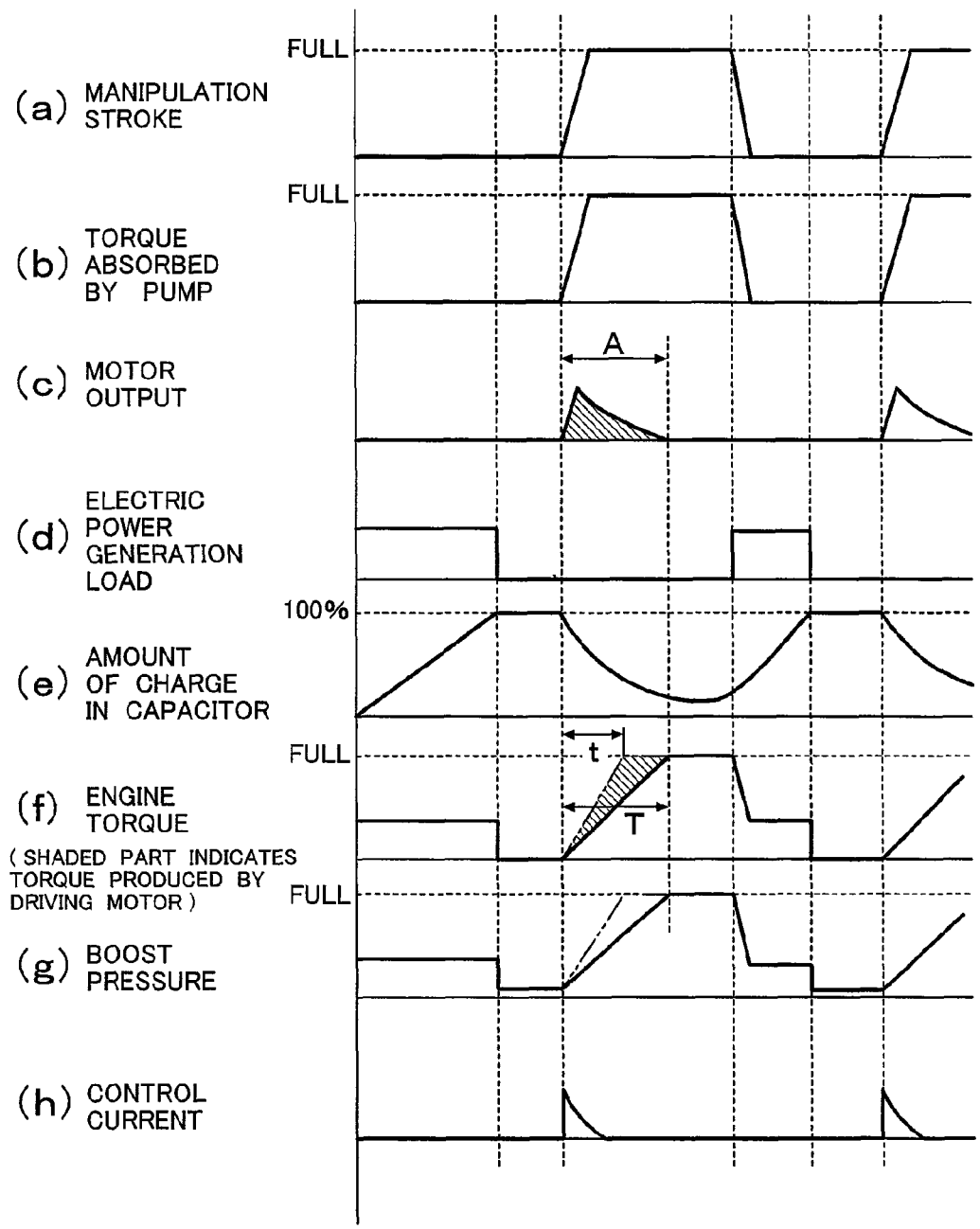
FIG. 2 is a diagram showing characteristics available from the embodiment.

When the control device 5 is manipulated from a neutral position to a maximum (full) position as shown in FIG. 2(*a*) in this embodiment constructed as described above, the manipulation stroke at this time is detected by the manipulation stroke detector 10 and its detection signal is outputted to the controller 9. At this time, characteristics of a torque absorbed by the pump are substantially in conformity with those of the manipulation stroke as illustrated in FIG. 2(*b*).

At the first computation unit 9a of the controller 9, a computation is performed to determine a manipulation stroke based on the signal outputted from the manipulation stroke detector 10. During this time, another computation is performed at the second computation unit 9b of the controller 9 to determine an amount of charge in the capacitor 8 based on the signal outputted from the capacitor 8.

At the determination processing unit 9c of the controller 9, a determination is made as to whether or not the manipulation stroke computed at the first computation unit 9a would increase a load on the hydraulic pump (a load to be absorbed by the hydraulic pump) to such a level as exceeding an output torque of the engine. Now assume that it is determined to exceed. In this case, a determination is made as to whether the boost pressure detected by the boost pressure sensor 11 is lower than the predetermined pressure. As appreciated from FIG. 2(*g*), the boost pressure is now determined to be lower than the predetermined pressure. In this case, a still further determination is made as to whether or not the amount of charge in the capacitor 8 as computed at the second computation unit 9b is an amount of charge that can drive the electric motor 2 for the predetermined time A.

It is to be noted that the above-mentioned predetermined time A is a driving time of the electric motor 2 which is considered to be able to provide an engine torque with a rise time t capable of suppressing a lag-down of the engine 1 which would occur upon full manipulation of the control device 5.

Further, the charging capacity of the capacitor 8 is set at a capacity that can drive the electric motor 2 for the predetermined time A with an electric motor output (torque) shown in FIG. 2(c) (which is equivalent to the area fraction of the shaded part in FIG. 2(c)).

On the other hand, the electric motor 2 is set to have an output torque of a magnitude corresponding to a differential torque between a maximum boost torque and a non-boost torque of the engine 1.

Now assume that as shown in FIG. 2(e), the amount of charge in the capacitor 8 has been determined to be close to 100% and to be an amount of charge that can drive the electric motor 2 for the predetermined time A.

At this time, an instruction signal, specifically, a control current shown in FIG. 2(h) is outputted from the controller 9 to the current controller 7 to perform instruction processing such that electric power capable of driving the electric motor 2 for the predetermined time A is discharged from the capacitor 8.

As a result, the capacitor 8 is discharged, and by the resulting electric power, the electric motor 2 is driven for the predetermined time A as shown in FIG. 2(c). Owing to this driving of the electric motor 2 for the predetermined time A, the load acting on the engine 1 is reduced, and during this period, the boost pressure rises as shown in FIG. 2(g). In concomitance with this, a drive torque by the electric motor, which is shown in FIG. 2(c) and is as much as that indicated by shading in FIG. 2(f), is added to an engine torque, so that the rise time t of the engine torque becomes shorter than a conventional general rise time T. The rise time t of the engine torque at this time becomes one that is close to the rise time of the torque to be absorbed by the pump illustrated in FIG. 2(b).

After elapse of the predetermined time A, for example, at the time of completion of the manipulation of the control device 5, the electric motor 2 acts as an electric power generator as shown in FIG. 2(d), and as illustrated in FIG. 2(e), its electric power is stored in the capacitor 8 via the current controller 7. It is to be noted that at the time of completion of the manipulation of the control device 5 (including a return interval from the fully-manipulated position to the neutral position), the load on the hydraulic pump (the load to be absorbed by the hydraulic pump) is in a state of a decrease from its maximum level.

It is to be noted that, when the manipulation stroke computed at the first computation unit 9a is not determined to be such that a torque to be absorbed by the hydraulic pump would exceed an output torque of the engine, the determination processing unit 9c does not perform the processing of deriving the electric motor 2 for the predetermined time A because the possibility of developing a lag-down of the engine 1 is low. When the boost pressure detected by the boost pressure detector 11 is not determined to be lower than the predetermined pressure but is determined to be a sufficiently high pressure, the determination processing unit 9c does not perform the processing of deriving the electric motor 2 for the predetermined time A either because the possibility of developing a lag-down of the engine 1 is low.

According to this embodiment constructed as described above, upon full manipulation of the control device 5, the capacitor 8 is discharged to drive the electric motor 2 so that a load to be applied to the engine 1 is reduced to shorten the rise time t of an engine torque close to a rise time of a torque to be absorbed by the pump, as mentioned above. It is, therefore, possible to reduce a lag-down of the engine 1, which tends to occur at the time of such full manipulation of the control device 5. In addition, after elapse of the predetermined time A, the electric motor 2 is driven by the engine 1 to perform charging of the capacitor 8 so that the capacitor 8 can be rendered ready for the time of subsequent full manipulation. It is, therefore, possible to decrease the consumption of energy required for the reduction of a lag-down of the engine 1 which is caused as a result of the absorption by the hydraulic pump of a torque greater than an output torque of the engine due to full manipulation of the control device 5, thereby making it possible to achieve excellent economy.

As the above-mentioned capacitor 8 has good response, it can be instantaneously discharged upon driving the electric motor 2 for the predetermined time A. It is, therefore, possible to control the electric motor 2 with good response, thereby making it possible to perform smooth control for the prevention of a lag-down. It is sufficient to feed electric power to the electric motor 2 only until a boost pressure rises, and therefore, a small storage capacity can suffice the need (electrical energy corresponding to the shaded part in FIG. 2(c). As a predetermined small capacity is sufficient as the storage capacity, the capacitor 8 allows a more-readily size reduction than a battery. According to this embodiment equipped with the capacitor 8, the engine control system requires smaller installation space for its mounting on a hydraulic excavator compared with one equipped with a battery as a storage device, and therefore, is excellent in practical utility.

As the load condition detecting means for detecting a condition that a torque to be absorbed by the hydraulic pump would exceed an output torque of the engine, one for detecting a manipulation stroke of the control device is employed in this embodiment. However, the load condition detecting means is not limited to such a detector, and a torque absorbed by the hydraulic pump may be detected instead. For example, it is possible to detect a delivery pressure of the hydraulic pump by a pressure sensor and to determine a torque absorbed by the hydraulic pump based on the pressure and a swash angle of the hydraulic pump. If the hydraulic pump is a variable displacement pump, a torque absorbed by the hydraulic pump may be determined based on a delivery pressure of the pump and a control pressure that controls the swash angle of the variable displacement pump. Such a load condition detecting means may be used as a load detecting means. In this case, the detection by this load detecting means of a condition that a torque to be absorbed by the hydraulic pump would exceed an output torque of the engine can be performed based on the magnitude of a rate of change in the torque absorbed by the hydraulic pump, and can be practiced by determining its magnitude beforehand through an experiment or the like.

The above-described condition can also be detected based on a difference between a torque absorbed by the hydraulic pump and an engine torque. In this case, a relationship between boost pressures detected by the boost pressure sensor and engine output torques determined from the boost pressures can be provided as a lookup table in advance. From a boost pressure detected by the boost pressure sensor, an engine output torque can be determined. The above-described condition can then be detected from a difference between the engine output torque and a torque absorbed by the hydraulic pump determined as described above.

The control of the electric motor by the determination processing means can also be performed based on known speed-sensing control. Described specifically, when it is desired to control a torque, which is to be absorbed by the hydraulic pump (the swash angle of the hydraulic pump), by a deviation of an actual engine speed from a target engine speed set by a target engine speed setting dial, it may be designed to assist the engine by using, as an output torque by the electric motor, a fraction of torque which has been decreased in accordance with the deviation and would otherwise be absorbed by the hydraulic pump.

LEGEND

1 Engine
2 Electric motor
3 Hydraulic pump
4 Hydraulic actuator
5 Control device
6 Control valve
7 Current controller
8 Capacitor
9 Controller
9a First computation unit (load condition detecting means)
9b Second computation unit (charge amount detecting means)
9c Determination processing unit (determination processing means)
10 Manipulation stroke detector (quick manipulation detecting means)
11 Boost pressure sensor

The invention claimed is:

1. An engine control system for a construction machine provided with a turbocharged engine, an electric motor and hydraulic pump drivable by the engine, a hydraulic actuator operable by pressure oil delivered from the hydraulic pump, a control device for controlling the hydraulic actuator, and a capacitor capable of feeding electric power to the electric motor, characterized in that the engine control system is provided with a load condition detecting means for detecting a condition that a torque to be absorbed the hydraulic pump would exceed an output torque of the engine, a charge amount detecting means capable of detecting an amount of charge in the capacitor, a boost pressure sensor, and a determination processing means for performing processing to feed electric power from the capacitor to the electric motor if, when the condition that a torque to be absorbed the hydraulic pump would exceed an output torque of the engine has been detected by the load condition detecting means in concomitance with manipulation of the control device, a boost pressure detected by the boost pressure sensor is determined to be lower than a predetermined pressure, and moreover, an amount of charge in the capacitor as detected by the charge amount detecting means is determined to be an amount of charge that can drive the electric motor for a predetermined time.

2. The engine control system according to claim 1, wherein the engine control system is provided with a manipulation stroke detecting means for detecting a manipulation stroke of the control device, and based on a maximum manipulation stroke of the control device as detected by the manipulation stroke detecting means, the load condition detecting means detects the condition that a torque to be absorbed the hydraulic pump would exceed an output torque of the engine.

3. The engine control system according to claim 1, wherein the engine control system is provided with a load detecting means for detecting a torque absorbed by the hydraulic pump, and based on a rate of change in the torque absorbed by the hydraulic pump as detected by the load detecting means, the load condition detecting means detects the condition that a torque to be absorbed the hydraulic pump would exceed an output torque of the engine.

4. The engine control system according to claim 2, wherein the engine control system is provided with an electric power generating means, and, when an amount of charge in the capacitor as detected by the charge amount detecting means is determined to be less than the amount of charge that can drive the electric motor for the predetermined time, the determination processing means, upon detection by the manipulation stroke detecting means of manipulation of the control device in a direction to decrease a torque to be absorbed. by the hydraulic pump or upon detection by the load detecting means of a decrease in the torque absorbed by the hydraulic pump, controls such that electric power generated by the electric power generating means is charged in the capacitor.

5. The engine control system according to claim 1, wherein the capacitor has been set to a capacity sufficient to cover driving of the electric motor for the predetermined time that compensates for a surplus in the torque to be absorbed by the hydraulic pump relative to an output torque of the engine in concomitance with manipulation of the control device.

6. The engine control system according to claim 5, wherein the electric motor has an output torque corresponding to a differential torque between a maximum boost torque and a non-boost torque of the engine.

7. The engine control system according to claim 3, wherein the engine control system is provided with an electric power generating means, and, when an amount of charge in the capacitor as detected by the charge amount detecting means is determined to be less than the amount of charge that can drive the electric motor for the predetermined time, the determination processing means, upon detection by the manipulation stroke detecting means of manipulation of the control device in a direction to decrease a torque to be absorbed by the hydraulic pump or upon detection by the load detecting means of a decrease in the torque absorbed by the hydraulic pump, controls such that electric power generated by the electric power generating means is charged in the capacitor.

* * * * *